United States Patent [19]

Chmelar

[11] Patent Number: 5,598,758
[45] Date of Patent: Feb. 4, 1997

[54] QUICK CHANGE CASSETTE HOLE PUNCH UNIT

[75] Inventor: Joe R. Chmelar, Caldwell, Tex.

[73] Assignee: Moore Business Forms, Inc., Grand Island, N.Y.

[21] Appl. No.: 524,167

[22] Filed: Aug. 31, 1995

Related U.S. Application Data

[63] Continuation of Ser. No. 94,883, Jul. 22, 1993, abandoned.

[51] Int. Cl.⁶ ........................................................... B26D 1/62
[52] U.S. Cl. ................... 83/100; 83/344; 83/346; 83/698.41
[58] Field of Search ........................... 83/343, 346, 344, 83/659, 669, 100, 698.41, 698.42, 348

[56] References Cited

U.S. PATENT DOCUMENTS

| | | | |
|---|---|---|---|
| 2,596,997 | 5/1952 | Harter | 153/2 |
| 3,381,560 | 5/1968 | Mages | 83/168 |
| 3,398,618 | 8/1968 | Schriber | 83/343 |
| 4,226,150 | 10/1980 | Reed | 83/346 |
| 4,276,797 | 7/1981 | Baumann et al. | 83/308 |
| 4,359,919 | 11/1982 | Fuchs et al. | 83/349 |
| 4,464,961 | 8/1984 | Tole et al. | 83/346 |
| 4,507,996 | 4/1985 | Kesten | 83/346 |
| 4,597,317 | 7/1986 | Heyden | 83/346 |
| 4,608,895 | 9/1986 | Bell et al. | 83/345 |
| 4,759,247 | 7/1988 | Bell et al. | 83/346 |
| 4,770,078 | 9/1988 | Gautier | 83/346 |
| 4,934,231 | 6/1990 | Chesnut | 83/343 |
| 4,999,968 | 3/1991 | Davis | 83/346 |
| 5,031,494 | 7/1991 | Asselborn et al. | 83/100 |
| 5,058,472 | 10/1991 | Kakko-Chiloff | 83/344 |
| 5,083,488 | 1/1992 | Stanley et al. | 83/346 |
| 5,088,367 | 2/1992 | Cracchiolo | 83/345 |
| 5,098,366 | 3/1992 | Gressman | 493/354 |
| 5,174,185 | 12/1992 | Aichele | 83/346 |
| 5,293,799 | 3/1994 | Ury | 83/346 |

Primary Examiner—Rinaldi I. Rada
Assistant Examiner—Allan M. Schrock
Attorney, Agent, or Firm—Nixon & Vanderhye, P.C.

[57] ABSTRACT

A quick change cassette hole punch unit for punching business forms allows the punch cylinder to be changed in a simple and effective manner. The cassette includes a frame having side members and a top member, and an anvil cylinder mounted on an anvil shaft for rotation about an axis stationary with respect to the frame, and a drive gear also mounted on the anvil shaft. A punch cylinder shaft is mounted on bearing assemblies for reciprocal movement with respect to the frame side members upon rotation of a screw shaft associated with each bearing assembly. The punch cylinder shaft can be disconnected from one of the bearing assemblies, slit with respect to the bearing assemblies to expose a free end, and the punch cylinder mounted on the punch cylinder shaft moved off the free end and replaced. All associated drive gear for the punch cylinder shaft is also replaced at the same time. A disogrin blanket may be wrapped around the anvil cylinder, and a punched paper suction removal device may be mounted on the punched cylinder shaft adjacent the punch cylinder.

10 Claims, 3 Drawing Sheets

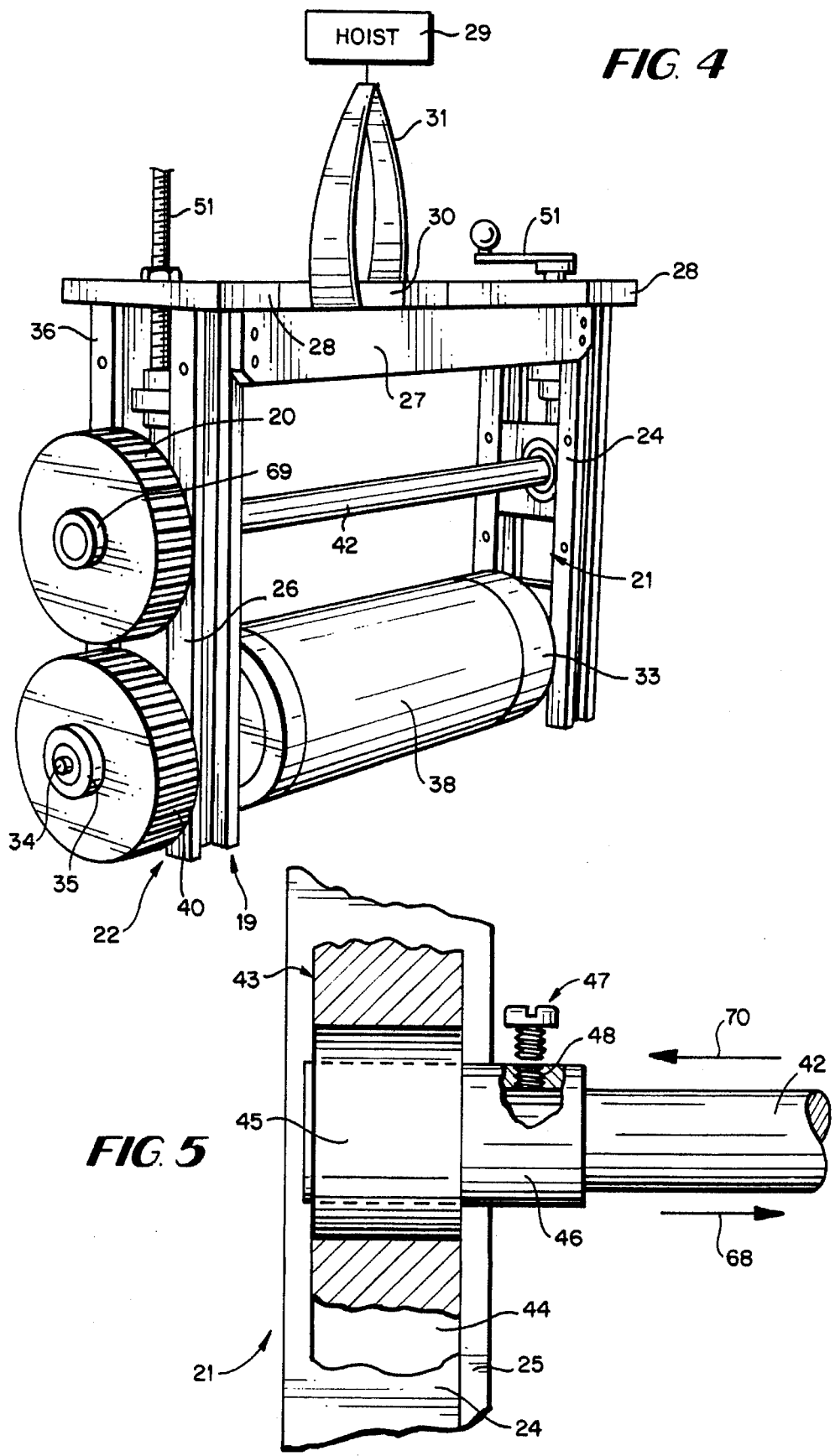

QUICK CHANGE CASSETTE HOLE PUNCH UNIT

This is a continuation of application Ser. No. 08/094,883, filed Jul. 22, 1993, now abandoned.

BACKGROUND AND SUMMARY OF THE INVENTION

Business forms processing equipment, such as collators, typically have punching attachments associated with them for forming different patterns and sizes of punched holes in business forms. For example, machines for that purpose include Hamilton Collators, as well as the Hamilton, HFV and 600 Collators. Conventional Hamilton Collators have individual cassettes which have an anvil roll, a punch cylinder of a particular size, and drive gears associated with the anvil roll and punch cylinder. Each time it is desired to change the punching pattern or size, it is necessary to remove the cassette and replace it with an entirely different cassette which requires a costly inventory of cassette units because a wide variety of different sizes must be kept on hand in order to have flexibility in punching business forms.

According to the present invention, the drawbacks associated with prior art collators with punch units, as described above, are avoided. According to the present invention it is necessary to only have a single cassette, and to mount a punch cylinder shaft in association with a cassette frame so as to accommodate a wide variety of different sizes of punch cylinders for business forms having lengths from 6 ½ to 24 inches. Quick changeover between one punching cylinder and another is provided according to the present invention, meaning that only punch cylinders need be inventoried, not entire cassettes. Yet there is no significant down time when changing from one punch cylinder to another according to the invention.

According to one aspect of the present invention a hole punch cassette is provided comprising the following elements: A frame having first and second side members and a top member. An anvil cylinder mounted on an anvil shaft, the anvil shaft mounted in bearings connected to the side members to define a first substantially horizontal axis stationary with respect to the frame. An anvil cylinder shaft mounted drive gear. A punch cylinder shaft. Means for releasably mounting the punch cylinder shaft to first and second bearing assemblies so that the punch cylinder shaft is parallel to the anvil shaft. Means for mounting the punch cylinder shaft bearing assemblies on the side members so that the bearing assemblies are reciprocal toward and away from the anvil cylinder. Means for releasably mounting a punch cylinder to the punch cylinder shaft. And means for releasably mounting a punch cylinder drive gear on the punch cylinder shaft.

The cassette according to the invention is provided in combination with a plurality of punch cylinders and matching punch cylinder drive gears, each of the punch cylinders and punch cylinder drive gears having an interior diameter slightly greater than the outside diameter of the punch cylinder shaft. A punched paper suction removal device (conventional per se) may be mounted on the punch cylinder shaft adjacent the punch cylinder on the shaft. The means for releasably mounting the punch cylinder and associated punch cylinder gear to the punch shaft may each comprise a conventional set screw. Also, the means for releasably mounting the punch cylinder shaft to the bearing assemblies may comprise a set screw cooperating with one of the bearing assemblies and the punch cylinder shaft.

The means for mounting the punch cylinder shaft bearing assemblies may comprise first and second screw shafts rotatably mounted on the first and second bearing assemblies, respectively, and first and second internally threaded portions stationarily mounted to the frame top member. A disogrin blanket may be wrapped around the anvil cylinder. Indicia may be provided on at least one of the frame side members for indicating the position to which the bearing assembly should be moved for punch cylinders of different sizes. Also, a hoist-connectable bar may be releasably connected to the top frame member to allow ready transport of the frame out of the collator to a work area where the punch cylinder is easily changed.

The invention also relates to a business form collator which includes a business form punching machine including a drive mechanism and a business forms feed mechanism. The collator comprises: A cassette having a frame, and a fixed axis anvil cylinder shaft with anvil cylinder and drive gear thereon, the drive gear cooperating with the drive mechanism. The cassette further comprises a punch cylinder shaft parallel to the anvil cylinder shaft and mounted on the frame for linear movement toward and away from the anvil cylinder shaft. And a punch cylinder and associated drive gear removably mounted on the punch cylinder shaft, so that the punch cylinder and associated gear may be replaced without replacing the entire cassette.

The invention also relates to a method of changing the punch cylinder in a business form punching apparatus. The method comprises the following steps: (a) Moving the punch cylinder shaft bearing assemblies on the frame away from the anvil cylinder so that there is significant clearance between the anvil and punch cylinders. (b) Disconnecting the punch cylinder shaft from the bearing assemblies so that the punch cylinder shaft is movable with respect to the bearing assemblies. (c) Removing the punch cylinder shaft drive gear from the punch cylinder shaft. (d) Moving the punch cylinder shaft with respect to the bearing assemblies so that the shaft is completely separated from one of the bearing assemblies, to provide a free end. (e) Removing the punch cylinder from the free end of the punch cylinder shaft. (f) Inserting a different punch cylinder, and associated drive gear, on the punch cylinder shaft. (g) Moving the punch cylinder shaft back into operative association with the bearing assemblies. And (h) moving the bearing assemblies of the punch cylinder shaft toward the anvil cylinder so that the punch cylinder and anvil cylinder and the punch cylinder drive gear and anvil shaft drive gear are in operative association with each other, with the punch cylinder and anvil shafts parallel to each other.

Steps (a) and (b) may be practiced by linearly reciprocating the bearing assemblies with respect to the frame by rotating a screw shaft associated with each of the bearing assemblies with respect to the frame. There may also be the further step of removing the frame from the business form punching apparatus and moving it to a remote location, and practicing steps (b) through (g) at the remote location. The removing step may be practiced by attaching a cross bar to the frame, connecting the hoist to the cross bar, and moving the frame with the hoist. Steps (b), (c) and (e) may be practiced, at least in part, by loosening a set screw. There may also be the further step of moving a punched paper suction removal device into association with the punch cylinder mounted on the punch cylinder shaft.

It is the primary object of the present invention to provide for the quick, efficient, cost effective changeover from one punch cylinder to another in the punching of business forms or the like. This and other objects of the invention will

BRIEF DESCRIPTION OF THE DRAWINGS

FIG. 4 is a top perspective view of the cassette of FIG. 3 shown being supported by a hoist, and without a punch cylinder mounted in association therewith; and FIG. 5 is a side view, partly in cross section and partly in elevation, schematically illustrating the releasable connection of the punch cylinder shaft to a bearing assembly, in the cassette of FIGS. 3 and 4.

DETAILED DESCRIPTION OF THE DRAWINGS

Figure 1:
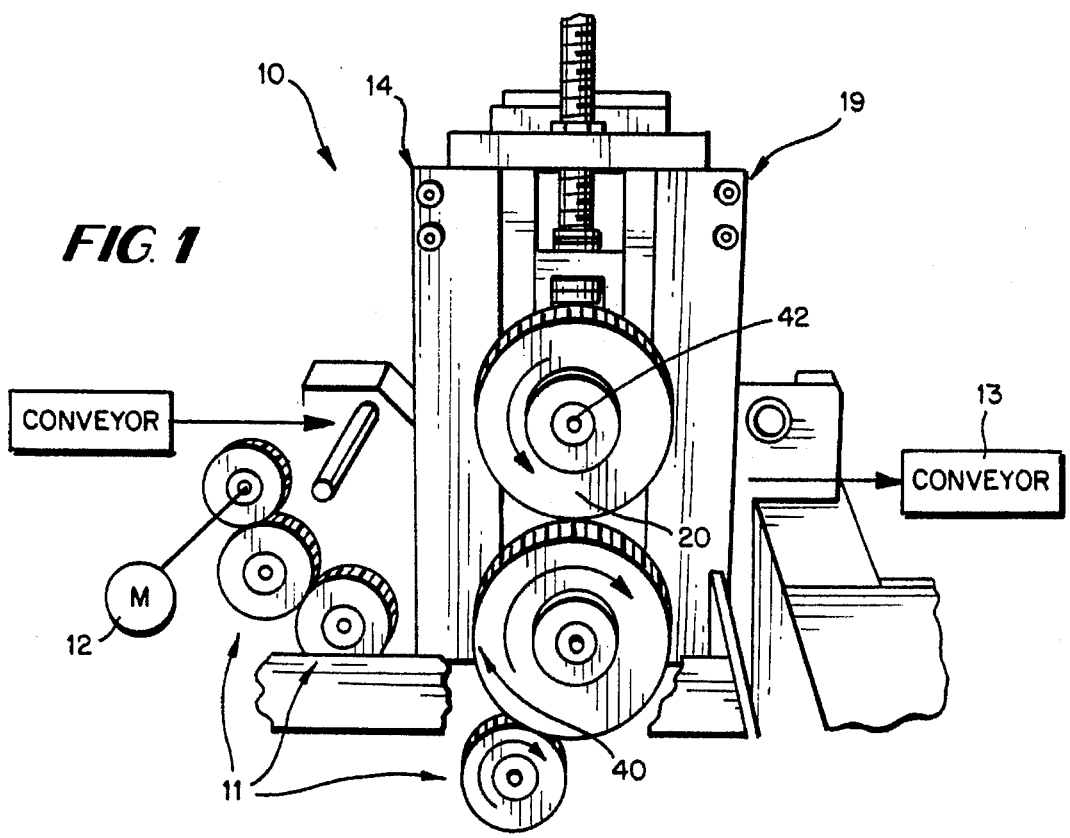
FIG. 1 is a side schematic view of an exemplary business forms collator including a business forms punching machine utilizing a cassette according to the present invention.
Figure 2:
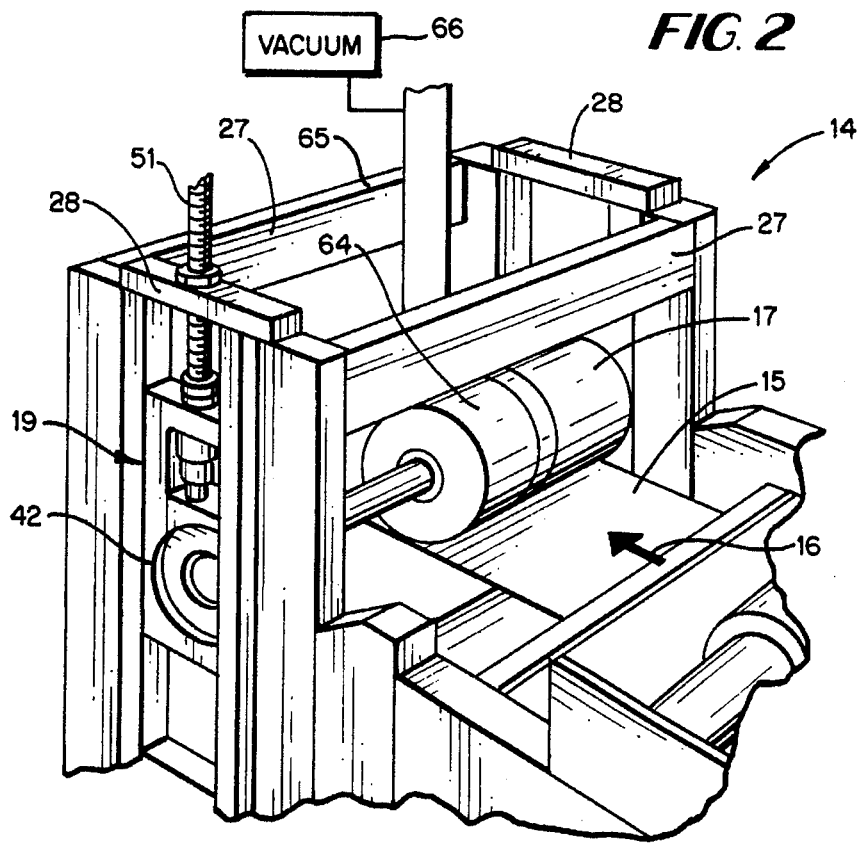
FIG. 2 is a top perspective view of the machine of FIG. 1 showing the business forms being punched thereby.

An exemplary business forms collator with which the invention is utilizable is shown generally by reference numeral 10 in FIG. 1, typically a Hamilton HVF or 600 Collator. The collator includes a business forms punching machine including a drive mechanism, shown schematically by gears 11 and motor 12 in FIG. 1, and a business forms feed mechanism. The business forms feed mechanism is shown only schematically at 13 in FIG. 1, and may include rollers, tractor drives, conveyor belts, or like mechanisms for feeding forms to a punching apparatus—shown generally by reference numeral 14 in FIG. 1—and then past the punching apparatus to other suitable forms handling equipment. FIG. 2 schematically illustrates continuous business forms 15 being conveyed in the direction of arrow 16 to the punching mechanism 14, a rotating punch cylinder 17 putting appropriately sized and positioned punches in the paper of the business forms 15 as they are continuously conveyed in direction 16.

The punching mechanism 14 in a conventional Hamilton Collator comprises a cassette with fixed position anvil cylinder and punch cylinder shafts. To change the punch size, position, or the like, it is typically necessary to replace the entire cassette. According to the present invention, however, a cassette is provided—shown generally by reference numeral 19 in FIGS. 1 through 4—from which the punch cylinder 17 (and associated drive gear 20) are removed and replaced but it is not necessary to replace the entire cassette. This allows a single cassette to be utilized instead of multiple cassettes, greatly reducing the cost of equipment associated with the collator (e.g. six cassettes of conventional sizes typically cost over $100,000, while the different punch cylinders and gears per se are only a part of that cost).

Figure 3:
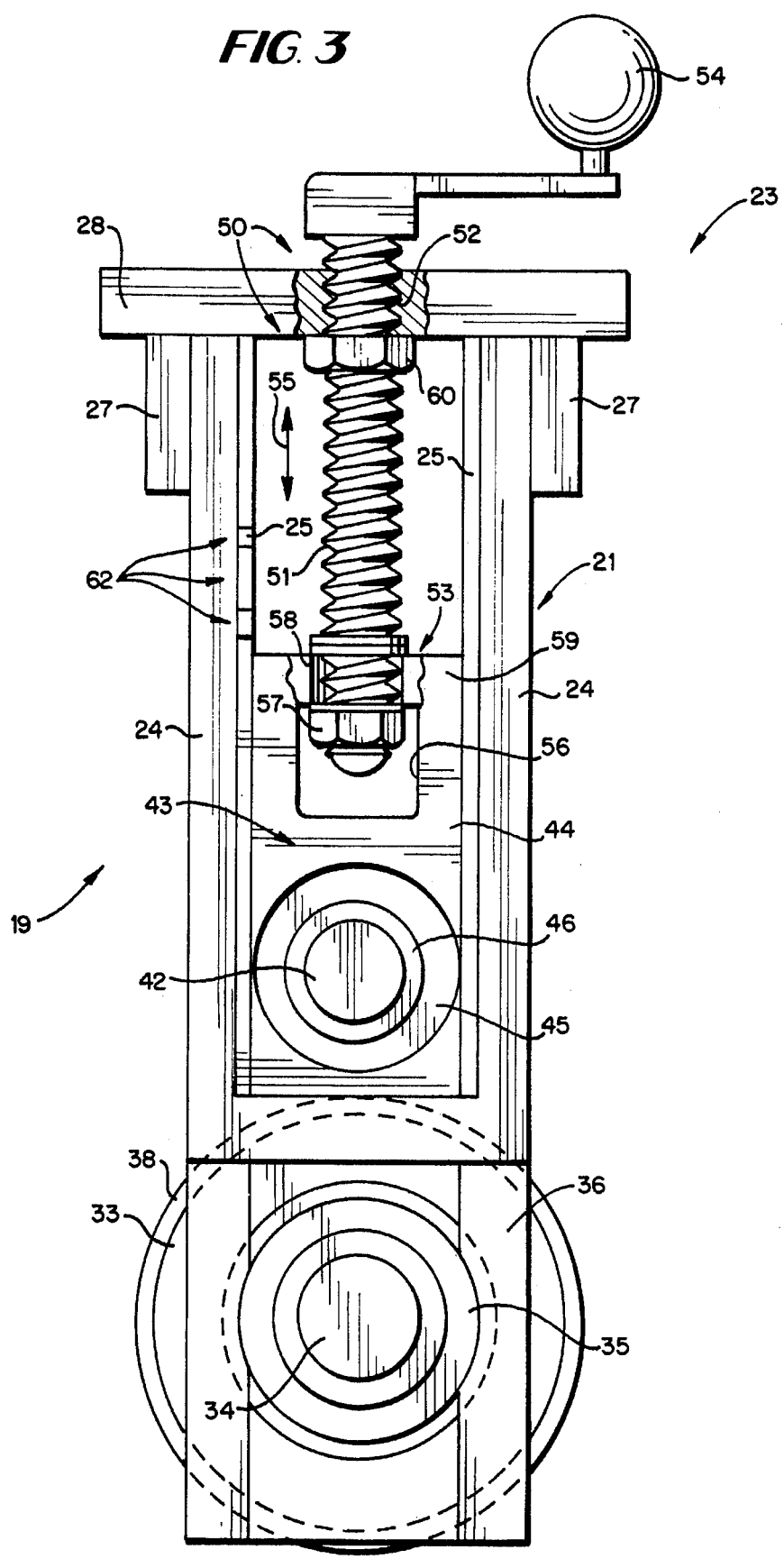
FIG. 3 is a side view, with portions cut away, of a cassette according to the present invention utilized in the apparatus of FIGS. 2 and 3.

A cassette 19 according to the present invention comprises a frame having first and second side members 21, 22, and a top member 23. The side member 21 (as seen in FIG. 3) may comprise two different vertically extending bars 24 with guide portions 25 thereof, while the side member 22 (see FIG. 4) includes similar bars 26 with similar guide rail portions (not shown) associated therewith. The frame top member 23—as seen in FIGS. 3 and 4—may comprise a pair of generally horizontal cross bars 27, extending between the sides 21, 22 and welded or attached by screw fasteners thereto, and a pair of uppermost cross bars 28 extending between the elements 24, and 25, respectively.

The frame of the cassette 19 is typically made of all metal components, such as steel, and since the entire cassette is relatively heavy it is desirable to move it utilizing equipment, such as a hoist shown schematically at 29 in FIG. 4. To this end, a removable cross bar 30 (see FIG. 4) may be connected between the bars 27, intermediate the bars 28, to allow movement. The bar 30 may be connected by screw fasteners (not shown) to the elements 27, and simply removed once a cassette 19 has been moved back into association with the machine 10. Once the cross bar 30 has been attached to the bars 27, a hoist sling 31 is passed around the bar 30, and then the cassette 19 is moved with the hoist 29.

The cassette 19 further comprises an anvil cylinder 33 (see FIGS. 3 and 4) mounted on an anvil shaft 34. The anvil shaft 34 is mounted in bearing 35 mounted in bearing blocks 36 which are rigidly connected (by screw threaded fasteners or the like) to the side members 21, 22 of the cassette 19. The shaft 34 defines a first substantially horizontal axis of rotation which is stationary with respect to the frame side members 21, 22. Although not necessary, it is preferred that a disogrin blanket 38 be wrapped around the anvil cylinder 33 (which cylinder 33 typically has a diameter of about 6.81 inches) to facilitate the punching action. Disogrin blankets are available from Belfon Machine Company, Inc. of Claremont, N.H., Stock No. Bel #72388.

The anvil shaft 34 also has a drive gear 40 mounted thereon (see FIGS. 1 and 4), which drive gear 40 meshes with the gear mechanisms 11 of the collator 10 drive, being powered by the motor 12. The drive gear 40 is on the opposite side of the frame side member 22 from the anvil 33, as clearly illustrated in FIG. 4.

The cassette 19 further comprises a punch cylinder shaft 42, visible in all of FIGS. 1 through 5. The shaft 42 is releasably mounted to first and second bearing assemblies. Only the bearing assembly 43 (see FIG. 3), on the opposite side of the shaft 42 from the drive gear 20, is clearly visible in the drawings, but the opposite bearing assembly (associated with the side of cassette 19 containing drive gear 20) is substantially identical. The bearing assembly 43 includes a bearing block 44, an outer bearing component 45, and an inner bearing component (sleeve) 46, the shaft 42 having an outside diameter just slightly less than the inside diameter of the inner bearing component 46. The outer bearing component 45 is fixed in the bearing block 44. Releasable connection of the shaft 42 from the bearing assembly 43 may be provided by a conventional set screw 47 (see FIG. 5), which extends through an internally screw threaded opening 48 in the bearing component 46 into locking engagement with the shaft 42. While a set screw 47 may be provided with both the bearing assemblies 43, only one need be provided, associated with the bearing assembly 43 seen in FIG. 3 (that is on the opposite side of the shaft 42 from the drive gear 20).

Means are also provided for mounting the punch cylinder shaft bearing assemblies 43 on the side members 21, 22 so that the bearing assemblies 43 are reciprocal toward and away from the anvil cylinder 33. Such means for moving the punch cylinder are shown generally by reference numeral 50 in FIG. 3, and comprise—for each bearing assembly 43—a vertical screw threaded shaft 51, an internally threaded bore 52 fixed to the frame (e.g. in the cross member 28 in the exemplary embodiment illustrated in FIG. 3), and bearing means 53 for connecting the shaft 51 to block 44 to allow rotation between them. The external screw threads on the shaft 51 correspond to the internal screw threads 52, and when the shaft 51 is rotated—e.g. by engaging the hand crank 54 connected to the top of the shaft 51 and rotating it—the shaft 51 will move up and down—as indicated by arrows 55 in FIG. 3—thereby moving the block 44 toward and away from the anvil cylinder 33. In order to allow releasable connection of the shaft 51 to the bearing block 44, a cutout 56 is provided in the bearing block to allow manipulation of an internally threaded nut 57 on the end of the shaft 51, and a smooth bore 58—of larger diameter than the shaft 51—is provided in the block 44 through which the shaft 51 extends. The components of the bearing 53 are above and below the block portion 59 through which the bore 58 extends.

In order to lock the blocks 44 into the positions to which they have been moved, a lock nut 60 is also provided on each shaft 51, cooperable with the cross bar 28. In FIG. 3 the lock nut 60 is shown in the locked configuration, but when it is desired to reciprocate the shaft 51, then nut 60 is loosened. In order to easily accommodate adjustment of the bearings 43 to desired positions for different punch cylinders 17 to be mounted thereon, indicia are preferably provided on at least one of the side members 21, 22. For example, as seen in FIG. 3, numerical indicia 62 are provided on the leftmost vertical bar 24 of the side frame member 21, indicating the positions to which the top of the block 44 should be moved to properly position punch cylinders 17 of different sizes.

Each punch cylinder 17 may be mounted to the shaft 42 by any suitable conventional means, such as a set screw 72, a TRANTORQUE® device, or other known mechanisms. Also, there typically is associated with the punch cylinder 17 a conventional punched paper suction removal device, illustrated by reference numeral 64 in FIG. 2, which is mounted right next to the punch cylinder 17 and removes all paper punched out of the business forms 15 by the cylinder 17. The device 64 is connected by a hose 65 to a source of vacuum 66, as is conventional. Moreover, a punch ring 72 may be centrally mounted on the punch cylinder. The punch ring can be a solid ring that slips onto the cylinder or a split ring with adjustable bushings that fit over the cylinder. By changing punch rings 72, different sized punchings can be achieved with a single punch cylinder.

In a typical manner of use of a cassette 19 according to the present invention, at a location remote from the collator 10, typically when supported by the hoist 29, the set screw 45 is loosened, allowing the end of the shaft 42 illustrated in FIG. 5 (associated with the side member 21 side bars 24) to be slid out of engagement with the bearing assembly 43 in the direction of arrow 68 in FIG. 5 until the free end of the shaft 42 is spaced a significant distance from the side frame 21. Then the attachments of both the punch cylinder 17 and the suction removal device 64 to the shaft 42 are loosened, and the suction removal device 64 and the punch cylinder 17 removed from the shaft 42, there being sufficient clearance between the end of the shaft 42 and the frame side member 21 to allow this. At the same time, the drive gear 20 associated with that particular cylinder 17 is removed from the shaft 42, as by loosening set screw 69 seen in FIG. 4. A new punch cylinder 17, of a different size of pattern, and a drive new drive gear 20 appropriate for that new punch cylinder 17, are then mounted on the shaft 42, the suction removal device 64 is replaced, and the shaft 42 moved back into engagement with the bearing assembly 43—being moved in the direction of arrow 70 as seen in FIG. 5. Then the set screw 47 is tightened, the punch cylinder 17 is tightened on the shaft 42, and the entire cassette 19 is moved by the hoist 29 to the collator 10.

The cassette 19 is lowered by the hoist 29 into the proper position within the collator 10, and then the hoist strap 31 is removed and the cross bar 30 detached. Then the gears 11 are moved into operative engagement with the anvil cylinder drive gear 40, and the hand cranks 54 are rotated to move the bearing assemblies 43 downwardly toward the anvil cylinder 33 until the appropriate indicia 62 along the side of the frame of the cassette 19 is reached. At that point, the drive gear 20 associated with the punch cylinder shaft 42 should mesh with the drive gear 40 of the anvil shaft 34, and the punch cylinder 17 should be appropriately positioned with respect to the disogrin blanket 38 of the anvil cylinder 33. Any fine adjustments that are necessary are made, and then the shafts 51 are locked in place by the lock nuts 60. When it is desired to remove the cassette again, the nuts 60 are loosened, the shafts 51 are rotated by the hand cranks 54, to move the bearing assemblies 43 away from the cylinder 33, the cross bar 30 is connected in place, the strap 31 disposed around it, and the hoist 29 is activated to remove the cassette from the machine 10 to a remote location, as illustrated in FIG. 4, whereby the procedures described above are repeated.

It will thus be seen that according to the present invention an advantageous apparatus and method have been provided for changing over from one punch cylinder to another in a business form punching machine. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A removable hole punch cassette adapted to be inserted into and removed from a collator having a vertical slot for receiving the hole punch cassette, said cassette comprising:

a cassette frame having first and second side members and a top member, wherein the first and second side members comprise guide rails to slidably engage the vertical slot of the collator;

an anvil cylinder mounted on an anvil shaft, said anvil shaft mounted in bearings fixed to said side members to define a first substantially horizontal axis stationary with respect to said cassette frame;

an anvil cylinder shaft drive gear mounted on said anvil shaft;

a punch cylinder shaft parallel to said anvil cylinder in said cassette frame and releasably mounted to first and second punch cylinder bearing assemblies;

the punch cylinder bearing assemblies each comprise a bearing block reciprocally mounted in said first and second side respectively, each bearing assembly having an annular outer bearing component mounted within the block and an inner bearing cylindrical component mounted within the annular outer bearing component, wherein the punch cylinder shalt includes opposite ends each releasably mounted in a respective one of the inner bearing cylindrical components;

a punch cylinder releasably mounted on said punch cylinder shaft and the cylinder shaft is slidable in a substantially horizontal direction to release the cylinder from said punch cylinder shaft and from said cassette; and means for releasably mounting a punch cylinder drive gear on said punch cylinder shaft so that the cylinder shaft is axially removable in a substantially horizontal direction from said cassette.

2. A cassette as recited in claim 1 in combination with a plurality of punch cylinders and matching punch cylinder drive gears wherein each pair of said plurality of punch cylinders and matching punch cylinder drive gears is adapted to be mounted in said cassette, and wherein each of said punch cylinders and punch cylinder drive gears have an interior diameter slightly greater than the outside diameter of said punch cylinder shaft.

3. A cassette as recited in claim 2 further comprising a punched paper suction removal device mounted on said punch cylinder shaft adjacent a punch cylinder on said shaft.

4. A cassette as recited in claim 2 wherein said means for releasably mounting said punch cylinder gear to said punch shaft comprises a set screw.

5. A cassette as recited in claim 2 further comprising indicia provided on at least one of said frame side members for indicating the position to which said first and second bearing assemblies should be moved for punch cylinders of different sizes.

6. A cassette as recited in claim 1 further comprising first and second screw shafts rotatably engaging the bearing blocks of said first and second bearing assemblies, and said screw shafts rotatably engaging said first and second internally threaded portions stationarily mounted to said frame top member.

7. A cassette as recited in claim 6 further comprising a hand crank connected to each of said first and second screw shafts, and a lock nut for locking each of said screw shafts in a position to which it has been moved with respect to said frame.

8. A cassette as recited in claim 1 further comprising a hoist-connectable bar releasably connected to said top frame member to allow ready transport of said frame.

9. A cassette as recited in claim 1 further comprising a disogrin blanket wrapped around said anvil cylinder.

10. A cassette as recited in claim 1 further comprising a replaceable slip ring mounted coaxially on said punch cylinder.

* * * * *